United States Patent
Liu

(10) Patent No.: US 11,705,606 B2
(45) Date of Patent: Jul. 18, 2023

(54) TAB AND BATTERY INCLUDING THE TAB

(71) Applicant: CALB Technology Co., Ltd., Jiangsu (CN)

(72) Inventor: Qinglei Liu, Changzhou (CN)

(73) Assignee: CALB Technology Co., Ltd., Jiangsu (CN)

( * ) Notice: Subject to any disclaimer, the term of this patent is extended or adjusted under 35 U.S.C. 154(b) by 165 days.

(21) Appl. No.: 17/151,682

(22) Filed: Jan. 19, 2021

(65) Prior Publication Data
US 2022/0069425 A1 Mar. 3, 2022

(30) Foreign Application Priority Data
Aug. 27, 2020 (CN) .......................... 202010876891.2

(51) Int. Cl.
*H01M 50/534* (2021.01)
*H01M 10/04* (2006.01)
(Continued)

(52) U.S. Cl.
CPC .......... *H01M 50/534* (2021.01); *H01M 10/04* (2013.01); *C25D 1/04* (2013.01);
(Continued)

(58) Field of Classification Search
CPC ...... H01M 50/534; H01M 10/04; H01M 4/70; H01M 10/0525; H01M 50/533;
(Continued)

(56) References Cited

U.S. PATENT DOCUMENTS

| 2010/0003599 A1 | 1/2010 | Nonoshita et al. |
| 2016/0260980 A1* | 9/2016 | Lee ........................ H01M 4/661 |
| 2019/0376198 A1* | 12/2019 | Dow ........................ C25D 3/38 |

FOREIGN PATENT DOCUMENTS

| CN | 204598315 | 8/2015 |
| CN | 108172748 | 6/2018 |

(Continued)

OTHER PUBLICATIONS

"Search Report of Europe Counterpart Application", dated Jul. 22, 2021, p. 1-p. 8.
(Continued)

*Primary Examiner* — Jonathan G Jelsma
*Assistant Examiner* — Omar M Kekia
(74) *Attorney, Agent, or Firm* — JCIP Global Inc.

(57) ABSTRACT

A tab, a preparation method thereof, and a battery including the tab are disclosed. The tab is a copper foil material, a surface of the copper foil material having a large compressive stress is an S surface, a surface having a small compressive stress is an M surface, and only the M surface is provided with an indentation or a reinforcing rib. In the preparation method of the tab of the disclosure, the S surface/M surface of the copper foil material are identified, and it is ensured that a feed direction is oriented so that the M surface faces outward (or inward), and winding/unwinding directions of each process and a mounting direction of an embossing device are reasonably fixed, so as to ensure that a tab emboss pattern of a product is pressed on the M surface of the copper foil material rather than the S surface or both surfaces.

11 Claims, 3 Drawing Sheets

(51) Int. Cl.
  *C25D 3/38* (2006.01)
  *C25D 1/04* (2006.01)
  *H01M 10/0525* (2010.01)
  *H01M 50/533* (2021.01)
  *H01M 4/66* (2006.01)
  *H01M 4/70* (2006.01)
(52) U.S. Cl.
  CPC .............. *C25D 3/38* (2013.01); *H01M 4/661* (2013.01); *H01M 4/70* (2013.01); *H01M 10/0525* (2013.01); *H01M 50/533* (2021.01); *Y02E 60/10* (2013.01); *Y02P 70/50* (2015.11)
(58) Field of Classification Search
  CPC . H01M 4/661; C25D 3/38; C25D 1/04; Y02P 70/50; Y02E 60/10
  USPC ......................................................... 429/163
  See application file for complete search history.

(56) References Cited

FOREIGN PATENT DOCUMENTS

| | | |
|---|---|---|
| CN | 109037589 | 12/2018 |
| CN | 208368608 | 1/2019 |
| CN | 211017230 | 7/2020 |
| CN | 111485260 | 8/2020 |
| JP | 2018186008 | 11/2018 |

OTHER PUBLICATIONS

"Office Action of China Counterpart Application", with English translation thereof, dated Apr. 2, 2022, p. 1-p. 13.

Office Action of China Counterpart Application, with English translation thereof, dated Dec. 5, 2022, pp. 1-12.

\* cited by examiner

TAB AND BATTERY INCLUDING THE TAB

CROSS-REFERENCE TO RELATED APPLICATION

This application claims the priority benefit of China application serial no. 202010876891.2, filed on Aug. 27, 2020. The entirety of the above-mentioned patent application is hereby incorporated by reference herein and made a part of this specification.

BACKGROUND

Technical Field

The disclosure belongs to the field of chemical power sources, and specifically relates to a tab for a battery and a battery including the tab.

Related Art

As a negative electrode current collector, the electrolytic copper foil generally has a thickness of 4 to 8 μm. For this type of ultra-thin copper foil, the rigidity of the foil material itself is relatively low. After die cutting, the tab is prone to folding and warpage due to the residual internal stress and external force, which affects the product quality and leads to short circuit risks.

Currently, a tab reinforcing rib device is adopted in the industry to emboss the two surfaces of the tab. Although doing so can enhance the strength of the tab and improve folding and warpage, some products still have the issue of tab folding. To reduce the rate of tab folding, some companies emboss the two surfaces the tab asynchronously, which nonetheless may lead to the issue of tab fracturing.

SUMMARY

The disclosure provides a tab and a battery including the tab.

One aspect of the disclosure provides a tab, which is a copper foil material. A surface of the copper foil material having a large compressive stress is an S surface, a surface having a small compressive stress is an M surface, and only the M surface is provided with an indentation or a reinforcing rib.

Another aspect of the disclosure provides a preparation method of a tab, including the following steps. Surfaces of a copper foil material are detected to identify an S surface and an M surface of the copper foil material. The S surface is a surface having a large compressive stress, and the M surface is a surface having a small compressive stress. A feed direction of the copper foil material and winding and unwinding directions of coating, rolling, slitting, and die cutting are controlled so that the M surface faces outward or inward. An indentation or a reinforcing rib is formed on the M surface.

Another aspect of the disclosure further provides a battery including the above tab.

BRIEF DESCRIPTION OF THE DRAWINGS

The above and other features and advantages of the disclosure will become more apparent in the detailed description of the exemplary embodiments with reference to the accompanying drawings.

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

Figure 1A:
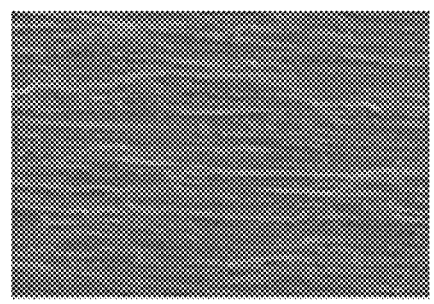
FIG. 1A is a photograph of a shiny surface of an electrolytic copper foil material magnified 1000 times.

The disclosure will be described in detail below with reference to the specific embodiments.

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

A tab of the disclosure is a copper foil material. A surface of the copper foil material having a large compressive stress is an S surface, a surface having a small compressive stress is an M surface, and the M surface is provided with an indentation or a reinforcing rib.

The tab of the disclosure is provided with an indentation or a reinforcing rib on the surface of the copper foil material having a small compressive stress to thereby counteract the residual stress (which is mainly the compressive stress on the surface having a large compressive stress). At the same time, configuring the indentation or the reinforcing rib can improve the rigidity of the tab and enhance the anti-deformation property, so as to avoid subsequent folding and warpage of the tab. In the preparation method of the tab of the disclosure, the S surface/M surface of the copper foil material are identified, and it is ensured that the feed direction is oriented so that the M surface faces outward (or inward). The winding/unwinding directions of each process and the mounting direction of the embossing device are reasonably fixed to thereby ensure that the tab emboss pattern of the product is pressed on the M surface of the copper foil material rather than the S surface or both surfaces. The method of the disclosure can ensure that, at the time of die cutting, production may proceed upon directly feeding the machine without rewinding, and the embossing effect is optimal. The method omits the rewinding operation in the conventional production method, avoids scrap, unqualified products, and hidden risks of tab folding in subsequent processes resulting from the trial-and-error method, and significantly improves the product quality, safety, and productivity.

For a copper foil material having different compressive stresses on its two surfaces, if the compressive stress on one surface is greater than the compressive stress on the other surface, the residual stress of the foil material will be embodied as a compressive stress toward the surface having the small compressive stress, and the copper foil is warped toward the surface (i.e., M surface) having the small compressive stress. Moreover, the greater the residual stress, the greater the degree of warpage of the copper foil. In the disclosure, by configuring an indentation or a reinforcing rib on the M surface of the copper foil material, the residual stress of the foil material can be counteracted to thereby avoid folding and warpage of the foil material.

Figure 1B:
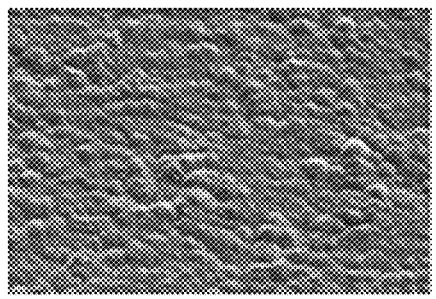
FIG. 1B is a photograph of a matte surface of an electrolytic copper foil material magnified 1000 times.

Specifically, the copper foil material may be an electrolytic copper foil, i.e., a foil material which is formed by electrolysis. For example, with a copper sulfate solution, by the action of electric current, metal copper is electrodeposited on the surface of a cathode roll and continuously peeled to form a base foil, and then the base foil is processed as required to form a finished foil material. The two surfaces of the electrolytic copper foil material have different surface crystallization configurations. The surface closely attached to the cathode roll is smoother and is referred to as the shiny surface (see FIG. 1A); the other surface showing a concavo-convex crystalline structure is rougher and is referred to as the matte surface (see FIG. 1B). In the electrolytic deposition process of the copper foil, crystalline stress is present inside the foil material, and both the shiny surface and the matte surface are under compressive stress. As the shiny surface has much smaller grains than the matte surface, the shiny surface has more grain boundaries, and the residual stress is mainly present at the grain boundaries. Therefore, the compressive stress of the shiny surface is always greater than the compressive stress of the matte surface, the residual stress is embodied as a compressive stress toward the matte surface, and the copper foil is warped toward the matte surface. Moreover, the greater the residual stress, the greater the degree of warpage of the copper foil. In the disclosure, by configuring an indentation or a reinforcing rib on the matte surface of the electrolytic copper foil material, the residual stress of the foil material can be counteracted to thereby avoid folding and warpage of the foil material.

In an optional embodiment, the shape of the indentation or the reinforcing rib may be one or more of a stripe and a dot. The stripe may extend in a direction perpendicular to a tab lead-out direction (i.e., horizontal stripe), may extend in the tab lead-out direction (i.e., vertical stripe), or extend in a direction other than the above two directions (i.e., oblique stripe). In some embodiments, the stripe may extend in the tab lead-out direction (i.e., vertical stripe), and the vertical stripe may counteract the residual stress of the foil material to the greatest extent to avoid folding and warpage of the foil material. When the shape of the indentation or the reinforcing rib is a dot, the diameter of the dot may be appropriately selected according to the actual requirements.

Figure 2A:
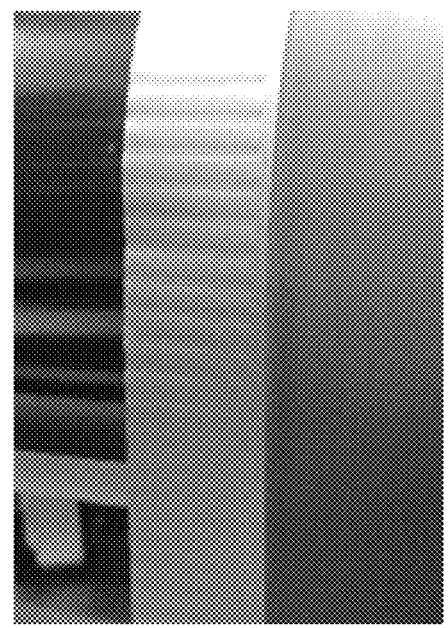
FIG. 2A is a photograph showing a tab indentation according to an embodiment of the disclosure.
Figure 2B:
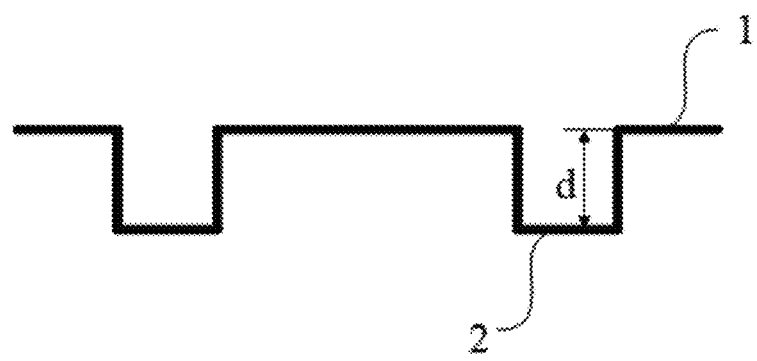
FIG. 2B is a schematic cross-sectional view of the copper foil material in the photograph shown in FIG. 2A.

In an optional embodiment, for a foil material having a thickness of 4 to 8 μm, the depth of the indentation or the height (d) of the reinforcing rib is between 60 and 120 μm to effectively counteract the residual stress of the foil material and effectively solve the issue of folding and warpage of the foil material. FIG. 2A shows a copper foil material having a vertical stripe as an example to illustrate the depth of the indentation or the height of the reinforcing rib on the copper foil material of the disclosure, but those skilled in the art will understand that the disclosure is not limited thereto. As shown in FIG. 2B, the depth of the indentation or the height of the reinforcing rib in the disclosure refers to the maximum distance from a foil material base surface 1 to a top surface 2 (or top point) of the indentation or the reinforcing rib. When the indentation or the reinforcing rib is another structure, the depth of the indentation and the height of the reinforcing rib in the disclosure are also defined as above.

A preparation method of a tab of the disclosure includes the following steps. Surfaces of a copper foil material are detected to identify an S surface and an M surface. The S surface is a surface having a large compressive stress, and the M surface is a surface having a small compressive stress. A feed direction of the foil material, and winding/unwinding directions of coating, rolling, slitting, and die cutting are controlled so that the M surface faces outward or inward. An indentation or a reinforcing rib is formed on the M surface.

In the preparation method of the disclosure, first the M surface and the S surface of the copper foil material are identified. For an electrolytic copper foil material, the surface having a large compressive stress is the shiny surface (i.e., S surface), and the surface having a small compressive stress is the matte surface (i.e., M surface). The foil material may be detected by an image measuring instrument, a roughness meter, a gloss meter, or naked eye to identify the matte surface and the shiny surface. Specifically, the shiny surface and the matte surface may be easily distinguished by observing the copper foil material in an image measuring instrument (which is an instrument necessary for the die cutting process). Alternatively, a roughness meter may be used to measure the roughness respectively on the two surfaces, and the matte surface is the surface having a great roughness. Alternatively, a gloss meter may be used to measure the gloss respectively on the two surfaces, and the surface having a greater gloss is the shiny surface. Alternatively, the copper foil material may be directly observed by naked eye, and the surface which presents a mirror-like surface with respect to light is the shiny surface.

Figure 3:
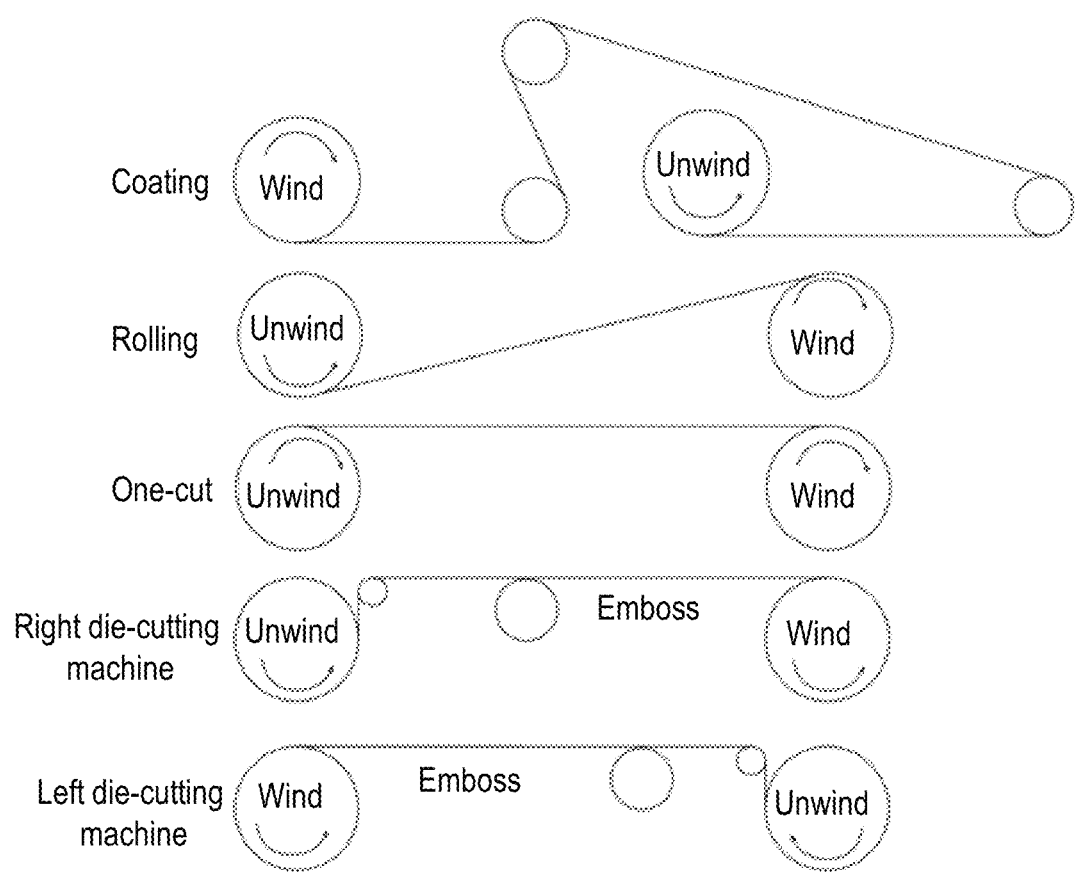
FIG. 3 is a schematic view showing a process of a preparation method of a tab according to the disclosure.

After the S surface and the M surface of the copper foil material are determined, the feed direction of the copper foil material and the winding/unwinding directions of coating, rolling, slitting, and die cutting are respectively fixed so that the M surface of all the copper foil material is on the outer side (or inner side) of the electrode roll at the time of unwinding for die cutting. Next, referring to FIG. 3, an example in which the copper foil material is an electrolytic copper foil material and the matte surface is on the outer side of the electrode roll at the time of unwinding for die cutting will be described to illustrate the process of the preparation method of the tab of the disclosure.

As shown in the figure, the matte surface of the foil material faces inward after the rolling process. Next, a first slitting process is performed on the negative electrode sheet, and the matte surface of the foil material still faces inward after the first slitting process. Finally, when die cutting is performed on the separated negative electrode sheet, embossing is performed simultaneously to form a tab having a matte surface provided with an indentation or a reinforcing rib. At the time of die cutting, a tab embossing device (tab reinforcing rib) is mounted at a fixed position of the die-cutting machine, and the electrode roll is threaded. At the time of die cutting, the tab is embossed, and it is ensured that the embossing device is in contact with the matte surface of the tab, i.e., the matte surface of the copper foil of the tab is pressed to form a reinforcing rib. The residual stress (which is mainly the compressive stress of the shiny surface) is counteracted by the pressure applied to the matte surface. At the same time, the rigidity of the tab emboss pattern is improved, and the anti-deformation property is enhanced, so as to avoid subsequent folding and warpage of the tab.

For an electrolytic copper foil material, the two surfaces are respectively a shiny surface and a matte surface. When the feed direction is inconsistent, the pressure-applying direction of a tab reinforcing rib pressure roller may be incorrect. If the reinforcing rib pressure roller is in contact with the matte surface, the effect will be better, and if it is in contact with the shiny surface, the effect will be worse. If the shiny surface of the entire roll is in contact with the reinforcing rib pressure roller, the tab of the electrode roll will be warped. In the actual production process in the industry, the shiny surface and the matte surface are not distinguished, and a trial-and-error method is adopted. If an electrode roll is seriously folded after die cutting, it is rewound to change the embossing direction of the reinforcing rib. This trial-and-error method wastes time and is not conducive to the improvement to the productivity and yield. Moreover, when there are occasional folds in die cutting (the folds are not serious), even if the shiny surface is embossed, the production will continue normally. Although the produced tab of the electrode roll does not show folds and warpage in the die cutting process, in the subsequent slitting and winding/lamination processes, further folding will occur and affect the product quality.

In the method of the disclosure, first, the S surface/M surface of the copper foil are identified, and it is ensured that the feed direction is oriented so that the matte surface faces outward (or uniformly inward). The winding/unwinding directions of each process and the mounting direction of the embossing device are reasonably fixed to thereby ensure that the tab emboss pattern of the product is pressed on the M surface of the copper foil rather than the S surface or both surfaces. The method of the disclosure can ensure that, at the time of die cutting, production may proceed upon directly feeding the machine without rewinding, and the embossing effect is optimal. The method omits the rewinding operation in the conventional production method, avoids scrap, unqualified products, and hidden risks of tab folding in subsequent processes resulting from the trial-and-error method, and significantly improves the product quality, safety, and productivity.

The tab of the disclosure may be used in a battery. In some embodiments, it is used as a tab of a lithium ion battery or a lithium battery. In some embodiments, it is used as a negative electrode tab of a lithium ion battery or a lithium battery.

The exemplary embodiments of the disclosure disclosed above are only intended to facilitate illustration of the disclosure. The exemplary embodiments do not describe all the details, and the disclosure is not exclusively limited to the described specific embodiments. Obviously, many modifications and changes may be made according to the content of the specification. The specification selects and specifically describes these embodiments to better illustrate the principles and practical applications of the disclosure, so that those skilled in the art can properly understand and apply the disclosure. The disclosure is only limited by the claims and their full scope and equivalents.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A tab, which is a copper foil material, wherein a surface of the copper foil material having a large compressive stress is an S surface, a surface having a small compressive stress is an M surface, and only the M surface is provided with an indentation or a reinforcing rib, and
    wherein a thickness of the copper foil material is 4 to 8 μm, and a depth of the indentation or a height of the reinforcing rib is between 60 and 120 μm.
2. The tab according to claim 1, wherein a shape of the indentation or the reinforcing rib is one or more of a stripe and a dot.
3. The tab according to claim 2, wherein the stripe extends in a tab lead-out direction.
4. The tab according to claim 3, wherein the copper foil material is an electrolytic copper foil material, the S surface is a shiny surface, and the M surface is a matte surface.
5. The tab according to claim 2, wherein the copper foil material is an electrolytic copper foil material, the S surface is a shiny surface, and the M surface is a matte surface.
6. The tab according to claim 1, wherein the copper foil material is an electrolytic copper foil material, the S surface is a shiny surface, and the M surface is a matte surface.
7. A battery comprising the tab according to claim 1.
8. A preparation method of a tab, comprising:
    detecting surfaces of a copper foil material to identify an S surface and an M surface of the copper foil material, wherein the S surface is a surface having a large compressive stress, and the M surface is a surface having a small compressive stress, wherein a thickness of the copper foil material is 4 to 8 μm;
    controlling a feed direction of the copper foil material and winding and unwinding directions of coating, rolling, slitting, and die cutting so that the M surface faces outward or inward; and
    forming an indentation or a reinforcing rib on the M surface, wherein a depth of the indentation or a height of the reinforcing rib is between 60 and 120 μm.
9. The preparation method of a tab according to claim 8, wherein a shape of the indentation or the reinforcing rib is one or more of a stripe and a dot.
10. The preparation method of a tab according to claim 9, wherein the stripe extends in a tab lead-out direction.
11. The preparation method of a tab according to claim 8, wherein the copper foil material is an electrolytic copper foil material, the S surface is a shiny surface, and the M surface is a matte surface.

* * * * *